(12) United States Patent
Park et al.

(10) Patent No.: US 10,304,419 B2
(45) Date of Patent: May 28, 2019

(54) SCREEN CONTROLLING METHOD AND ELECTRONIC DEVICE SUPPORTING THE SAME

(71) Applicant: Samsung Electronics Co., Ltd., Gyeonggi-do (KR)

(72) Inventors: Ji Sun Park, Seoul (KR); Won Hee Seo, Gyeonggi-do (KR); In Seog Ku, Gyeonggi-do (KR); Woo Geun Kim, Gyeongsangbuk-do (KR); Il Jung, Seoul (KR); Dae Hyun Cho, Gyeonggi-do (KR); Dae Sik Hwang, Daegu (KR); Moo Young Kim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/665,826

(22) Filed: Aug. 1, 2017

(65) Prior Publication Data
US 2018/0033406 A1 Feb. 1, 2018

(30) Foreign Application Priority Data
Aug. 1, 2016 (KR) .................. 10-2016-0097835

(51) Int. Cl.
*G09G 5/391* (2006.01)
*G09G 3/20* (2006.01)
*G09G 5/373* (2006.01)

(52) U.S. Cl.
CPC ............ *G09G 5/391* (2013.01); *G09G 3/2096* (2013.01); *G09G 5/373* (2013.01); *G09G 2320/0606* (2013.01); *G09G 2320/08* (2013.01); *G09G 2330/021* (2013.01); *G09G 2340/0407* (2013.01); *G09G 2354/00* (2013.01)

(58) Field of Classification Search
USPC ........................................... 345/428
See application file for complete search history.

(56) References Cited

U.S. PATENT DOCUMENTS

| | | | |
|---|---|---|---|
| 2005/0068311 A1 | 3/2005 | Fletcher et al. | |
| 2007/0094519 A1 | 4/2007 | Yamamoto | |
| 2013/0033477 A1* | 2/2013 | Sirpal | G06F 1/1616 345/211 |
| 2013/0127811 A1 | 5/2013 | Fletcher et al. | |
| 2015/0348493 A1* | 12/2015 | Chae | G09G 5/00 345/212 |
| 2016/0155411 A1 | 6/2016 | Liu | |
| 2016/0249289 A1* | 8/2016 | Threlkeld | H04W 52/0209 |
| 2017/0075516 A1* | 3/2017 | Park | G06F 3/04842 |
| 2017/0110093 A1* | 4/2017 | Stein | G09G 5/30 |

* cited by examiner

*Primary Examiner* — Kimbinh T Nguyen
(74) *Attorney, Agent, or Firm* — Cha & Reiter, LLC

(57) ABSTRACT

An electronic device and method are disclosed herein. The electronic device includes a display, a display driver integrated circuit, a memory and a processor, which implements the method. The method includes outputting a first screen to a display in a first resolution, when a resolution change condition is detected by a processor, changing the first screen to display a second screen in a second resolution different from the first resolutions; and adjusting performance of a system resource of the electronic device.

20 Claims, 11 Drawing Sheets

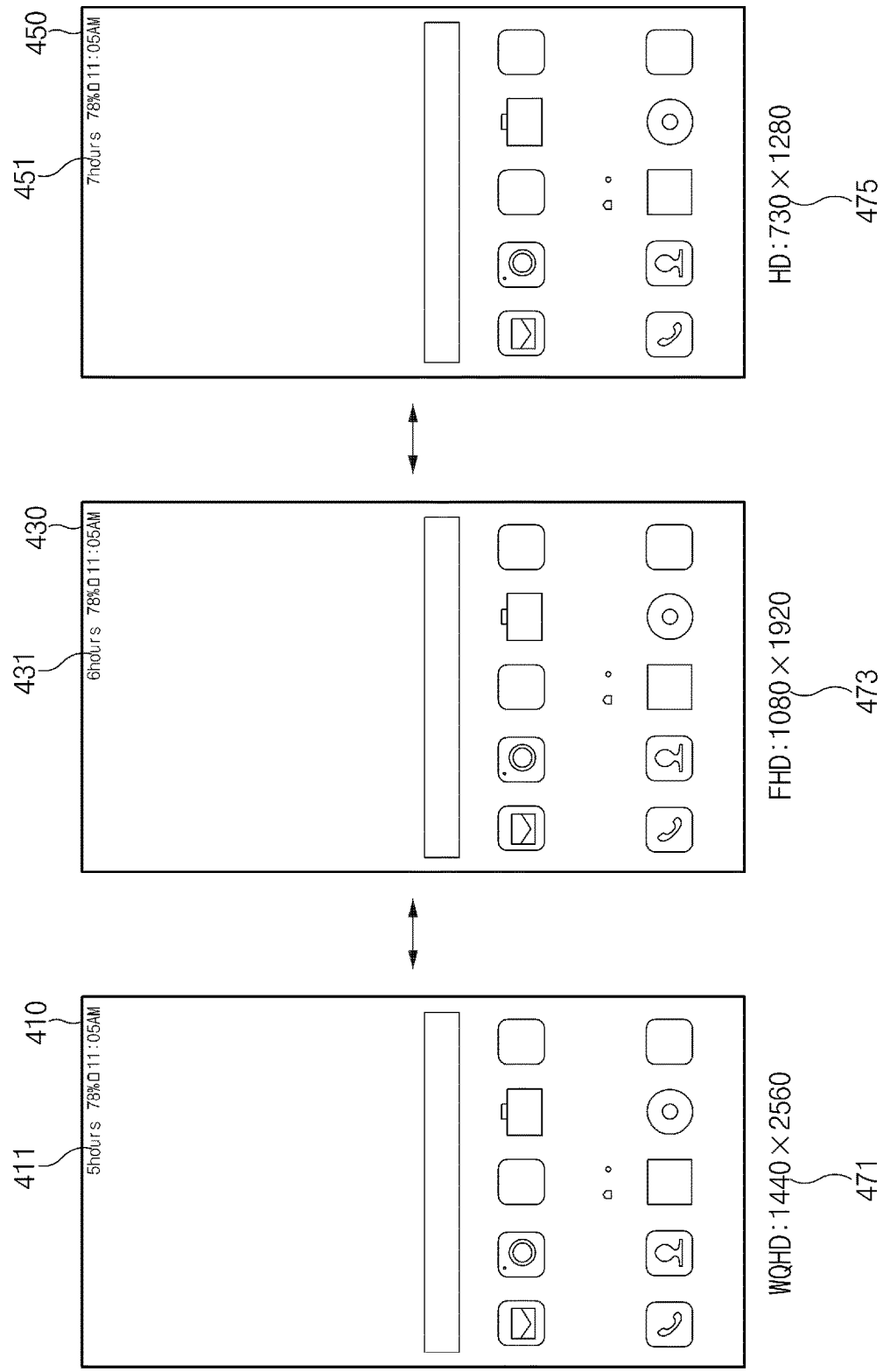

| Process State | Description |
|---|---|
| PROCESS_STATE_PERSISTENT=0 | system process |
| PROCESS_STATE_PERSISTENT_UI=1 | system process + ui |
| PROCESS_STATE_TOP=2 | top activities |
| PROCESS_STATE_BOUND_FOREGROUND_SERVICE=3 | system binding foreground service |
| PROCESS_STATE_FOREGROUND_SERVICE=4 | foreground service |
| PROCESS_STATE_TOP_SLEEPING=5 | same a STATE_TOP=2 while device sleeping |
| PROCESS_STATE_IMPORTANT_FOREGORUND=6 | important to user |
| PROCESS_STATE_IMPORTANT_BACKGORUND=7 | important to user |
| PROCESS_STATE_BACKUP=8 | in the background running backup/restore operation |
| PROCESS_STATE_HEAVY_WEIGHT=9 | in the background, but it cant restore its state |
| PROCESS_STATE_SERVICE=10 | background running service |
| PROCESS_STATE_RECEIVER=11 | background running service |
| PROCESS_STATE_HOME=12 | in the background but hosts the home activity |
| PROCESS_STATE_LAST_ACTIVITY=13 | in the background but hosts the last shown activity |
| PROCESS_STATE_CHCHED_ACTIVITY=14 | being cached for later use |
| PROCESS_STATE_CHCHED_ACTIVITY_CLIENT=15 | being cached for later use |
| PROCESS_STATE_CHCHED_EMPTY=16 | being cached for later use |

FIG. 5

SCREEN CONTROLLING METHOD AND ELECTRONIC DEVICE SUPPORTING THE SAME

CLAIM OF PRIORITY

This application claims the benefit under 35 U.S.C. § 119(a) of a Korean patent application filed on Aug. 1, 2016 in the Korean Intellectual Property Office and assigned Serial number 10-2016-0097835, the entire disclosure of which is hereby incorporated by reference.

TECHNICAL FIELD

The present disclosure relates to a screen controlling method and an electronic device supporting the same.

BACKGROUND

An electronic device such as a smartphone or the like may provide an execution environment of an application supporting various functions. For example, the electronic device may control system resources, such as a memory, a display, and the like such that applications supporting certain functions, such as a call function, a camera shooting function, a game, a web search function, and the like, may be installed and executed.

In the meantime, in a resolution configuration screen or a configuration screen of an application, the electronic device may change a resolution of a screen based on a user's settings. In addition, when the resolution of the screen is changed, a size of user interface (UI) (e.g., a display object) output to the screen may also be changed.

A conventional electronic device may not support changing the resolution of the screen depending on a state of the electronic device (e.g., a state where a battery is low), or a type of application presently being executed. Furthermore, even though changing the resolution of the screen, the conventional electronic device may provide a visual effect such as a change of the UI. For example, the conventional electronic device may not increase the efficiency of the system resources such as an increase in battery life or freeing a storage space of the memory depending on the resolution change of the screen. Moreover, since a flicker of the screen occurs when the conventional electronic device changes the resolution of the screen, the conventional electronic device may not provide continuity of a screen output.

SUMMARY

Aspects of the present disclosure are to address at least the above-mentioned problems and/or disadvantages and to provide at least the advantages described below. Accordingly, an aspect of the present disclosure is to provide a screen controlling method that changes a resolution of a screen depending on a state of an electronic device or a type of an application, and an electronic device supporting the same.

In addition, another aspect of the present disclosure is to provide a screen controlling method that adjusts the performance of a system resource while changing the resolution of the screen, and an electronic device supporting the same.

Furthermore, another aspect of the present disclosure is to provide a screen controlling method that resets an application process depending on a state of the application process when changing the resolution of the screen, or notifies the application process of a change in the resolution, and an electronic device supporting the same.

In accordance with an aspect of the present disclosure, an electronic device includes a display configured to display a screen, a display driver integrated circuit (IC) included in the display or electrically coupled with the display, a memory configured to store an application, and a processor operatively coupled with the display, the display driver IC, and the memory. The processor is configured to transmit first data corresponding to a first screen in a first resolution to the display driver IC to output the first screen to the display, convert the first data into second data corresponding to a second screen of a second resolution different from the first resolution when a resolution change condition occurs, transmit the second data to the display driver IC to output the second screen to the display, and adjust performance of a system resource included in the electronic device.

In accordance with another aspect of the present disclosure, a screen controlling method of an electronic device includes outputting a first screen to a display in a first resolution, when a resolution change condition is detected by a processor, changing the first screen to display a second screen in a second resolution different from the first resolution, adjusting performance of a system resource of the electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is a screen view for describing a resolution change of a screen, according to various embodiments of the disclosure.

FIG. 5 is a table for describing a state of an application process, according to various embodiments of the disclosure.

Throughout the drawings, it should be noted that like reference numbers are used to depict the same or similar elements, features, and structures.

DETAILED DESCRIPTION

Figure 1:
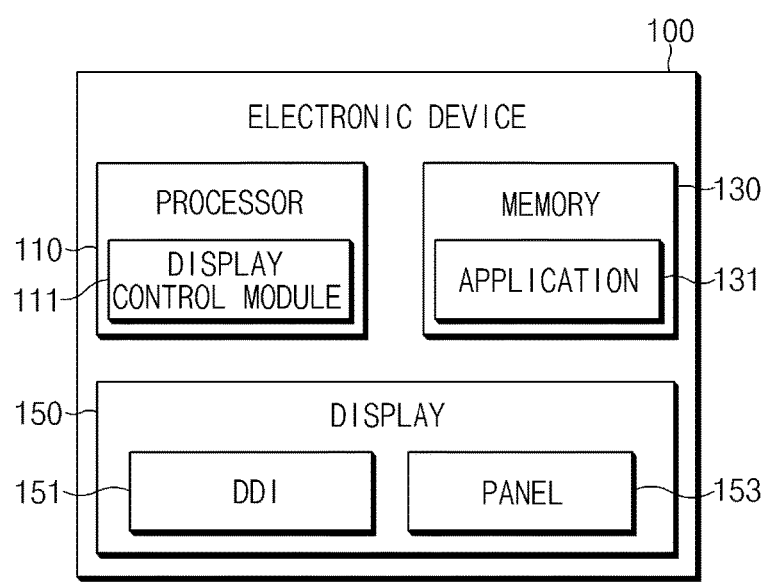
FIG. 1 is a block diagram of an electronic device associated with screen control, according to various embodiments of the disclosure.

Hereinafter, various embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the appended claims and their equivalents. With respect to the descriptions of the accompanying drawings, like reference numerals refer to like elements.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustrative purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the present disclosure, but are not intended to limit the elements. For instance, "a first user device" and "a second user device" may indicate different users regardless of order or importance. For example, a first component may be referred to as a second component and vice versa without departing from the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of" For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit)

In some various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ or PlayStation™), an electronic dictionary, an electronic key, a camcorder, or an electronic picture frame In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1 is a block diagram of an electronic device associated with screen control, according to various embodiments of the disclosure.

According to various embodiments, an electronic device 100 may change a resolution of a screen of a display 150 depending on a state of the electronic device 100, a type of an application 131 being executed, or the like. For example, in a state where a battery is low, or in the case where the application 131 being executed is an application (e.g., a game application or the like) that excessively uses a system resource of the electronic device 100, the electronic device 100 may change the resolution of the screen. In addition, the electronic device 100 may extend a time period to use the electronic device 100 (e.g., battery life) without charging the battery or may free a storage space of a memory 130 without connecting an additional memory (e.g., an external memory), by adjusting the performance of the system resource while changing the resolution of the screen.

Referring to FIG. 1, the electronic device 100 that performs the above-described function may include a processor 110, the memory 130, and the display 150. However, a configuration of the electronic device 100 is not limited thereto. According to various embodiments, the electronic device 100 may omit at least one of the above-described elements, or may further include at least another element. For example, the electronic device 100 may further include an input/output interface or a communication interface.

The processor 110 may include one or more of a central processing unit (CPU), an application processor (AP), or a communication processor (CP). The processor 110 may perform data processing or an operation associated with control and/or communication of at least one other element (s) of the electronic device 100. For example, the processor 110 may control the hardware or software components connected to the processor 110 by driving an operating system (OS) or an application program and may perform various data processing and arithmetic operations.

According to an embodiment, the processor 110 may determine the state of the electronic device 100. For example, the processor 110 may determine the state of the electronic device 100 by verifying the battery level, a state of a storage space of the memory 130, or the like. In addition, the processor 110 may verify a type of the execution-requested application 131 and may determine how much the application 131 uses the system resource of the electronic device 100. For example, the processor 110 may verify a type of the application 131 by analyzing meta information of the application 131. If the type of the application 131 is verified, the processor 110 may determine the system resource, which the application 131 uses, depending on the type of the application 131. For another example, the processor 110 may extract a resource (e.g., a file such as an image, a video, an audio, or the like) included in the application 131 to verify the size of the resource stored in the memory 130.

According to an embodiment, the processor 110 may change the resolution of the screen of the display 150 depending on a state of the electronic device 100, a type of the application 131, or the like. For example, in the case where the electronic device 100 is in a state where the battery is low or in a state where the storage space of the memory 130 is insufficient, the processor 110 may lower the resolution of the screen. For another example, if system resource usage of the application 131 is not less than a specified size, the processor 110 may lower the resolution of the screen.

In this regard, the processor 110 may convert first data, which is output to the screen of the display 150 and which corresponds to a first resolution, into second data corresponding to a second resolution. For example, the processor 110 may assign (or store) the second data, which is obtained by changing the first data, to (or in) a frame buffer to (or in) which the data output to the screen of the display 150 is assigned (or stored). In the case where the resolution of the screen is lowered, an amount (e.g., a data size) of the second data may be less than an amount (e.g., a data size) of the first data. According to an embodiment, the processor 110 may obtain the second data by merging or removing a part of the first data. Since an area to which the second data is assigned is less than an area to which the first data is assigned in the frame buffer, the amount of computation processed by the processor 110 may be reduced. As such, as the amount of processing processed by the processor 110 decreases, battery consumption may decrease, and the amount of usage of the memory 130 may also be reduced.

According to an embodiment, when changing the resolution of the screen, the processor 110 may adjust the performance of a system resource of the electronic device 100. For example, while lowering the resolution of the screen, the processor 110 may change the operating of a system resource used to output (e.g., rendering) data (e.g., the first data) corresponding to an existing high resolution into the operating of the system resource used to output data (e.g., the second data) corresponding to the changed low resolution. For example, the processor 110 may change a central processing unit (CPU) clock booster policy, a CPU governor policy, a CPU scheduler policy, or the like, which operated in a screen of a high resolution, to be used in a screen of the low resolution. The processor 110 may reduce consumption of the battery by adjusting the performance of the system resource.

In this regard, the CPU clock booster policy may include a method of adjusting CPU boosting. The CPU boosting may include a method of boosting a CPU clock during a specific operation section such that a specific function utilized for high performance is smoothly executed. For example, if a touch event, a multi-touch event, or the like occurs, the processor 110 may boost the CPU clock during an operation section or during a specific time period such that buffering, an input error, or the like does not occur. The CPU boosting adjusting function may be used for various operations such as occurrence of a scroll event, sensing of a gesture, or the like.

According to an embodiment, when the resolution of the screen is changed, the processor 110 may readjust various parameters of the CPU boosting policy, which operates in the high resolution, to be suitable for the low resolution. As such, current consumed in the processing of the processor 110 may be reduced. For example, when the touch event occurs, the processor 110 may lower a max clock parameter of the CPU boosting or may reduce time duration for the CPU boosting.

The CPU governor policy may include a policy for determining the operating of the CPU clock. The CPU clock operating scheme may include, for example, an on-demand scheme, a conservative scheme, a performance scheme, a power-save scheme, an interactive scheme, or the like. In the on-demand scheme, if a task starts while the processor 110 operates at a min clock, a clock speed of the processor 110 may increase up to the max clock at once to operate the processor 110. In the conservative scheme, if the task starts while the processor 110 operates at the min clock, the clock speed of the processor 110 may stepwise increase to operate the processor 110, and then may stepwise decrease to operate the processor 110. In the performance scheme, the processor 110 may be operated at the max clock. In the power-save scheme, the processor 110 may be operated at the min clock. In the interactive scheme, the clock speed of the processor 110 may increase in the on-demand scheme when increasing, and the clock speed of the processor 110 may decrease in the conservative scheme when decreasing.

According to an embodiment, as the resolution of the screen is changed, the processor 110 may readjust each of parameters of the CPU governor policy to a value suitable for an operation of the low resolution. For example, if the resolution of the screen is changed into the low resolution even though the processor 110 is using the interactive scheme, the processor 110 may adjust the max clock parameter to be lowered when increasing the clock speed from the min clock to the max clock. Alternatively, when stepwise decreasing the clock speed from the max clock to the min clock, the processor 110 may adjust a time duration parameter. Due to the change in the parameter, current consumed in the processing of the processor 110 may be reduced. According to an embodiment, in the case where the resolution of the screen is changed, the processor 110 may change the CPU clock operating scheme itself. For example, when the resolution of the screen is changed into the low resolution, the processor 110 may change the CPU clock operating scheme from the interactive scheme to the power-save scheme.

According to an embodiment, when changing the resolution of the screen, the processor 110 may apply the change in the resolution to the application process associated with the output of the screen. For example, the processor 110 may transmit a relevant instruction to the display 150 such that the application process outputting a user interface (UI) (e.g., a display object) outputs a UI suitable for the changed resolution. For example, the instruction may include configuration change intent in an android OS-based system. However, it is understood by those skilled in the art that the instruction is changed depending on the type of an OS.

According to an embodiment, the processor 110 may differently apply a change in the resolution depending on a state of the application process. For example, the processor 110 may notify a first application process, which is associated with an output of a current screen, from among application processes that the resolution is changed. In addition, the processor 110 may reset a second application process that is not associated with the output of the current screen. For example, the processor 110 may transmit the instruction to the first application process and may allow the first application process to output a UI to be suitable for the resolution. The processor 110 may regenerate the second application process to be suitable for the resolution by resetting the second application process.

In this regard, the application process may include a separate UI component (e.g., window activity) for outputting the UI. When the application process is generated or starts, the UI component may obtain information of the display 150 from a system and may output the UI based on the obtained information. For example, the application process may set or adjust a layout to be suitable for the resolution of the screen, may select a resource, which is suitable for the resolution, among the relevant resource set, and may load the resource to the memory 130. In this regard, the application 131 may include the resource set for each resolution. For example, the application 131 may include a first resource, a second resource, and a third resource that correspond to a first resolution, a second resolution, and a third resolution, respectively.

According to an embodiment, the processor 110 may transmit a change notification (e.g., configuration change intent) of the resolution to a foreground application process, and may reset a background application process. The application process that receives the change notification of the resolution may relaunch the UI component, or may change the UI by adjusting the layout at once or by loading the resource suitable for the resolution to the memory 130, without relaunching the UI component. As such, the continuity of the screen output may be prevented from decreasing such as screen flickering.

In any embodiment, the processor 110 may transmit the change notification of the resolution to the application process managed (e.g., registered in a whitelist (or preconfigured list)) by configuration as well as the foreground application process. For another example, the processor 110 may reset an application process, which remains in an inactive state for a specified time period, of background application processes. For example, since a music playing application continuously remains in an active state even though being in a background state, the processor 110 may not reset a process of the music playing application by registering the process of the music playing application in the whitelist. For another example, since a service such as a Bluetooth connection manager or the like needs to continuously maintain, for ease of use, a process (e.g. a process of the service is set to not terminated (or killed) for at least a predetermined time period), the processor 110 may not reset a process of the service by registering the process of the service in the whitelist. According to an embodiment, the processor 110 may transmit a change notification of the resolution to a process of a preloaded application and may reset a process of a third party application. However, the control of the application process is not limited thereto.

According to various embodiments, the processor 110 may differently control the application process depending on an implementation state of the application 131 applied to the electronic device 100.

The memory 130 may include a volatile and/or a nonvolatile memory. The memory 130 may store instructions or data associated with at least one other element(s) of the electronic device 100. According to an embodiment, the memory 130 may store software and/or a program. For example, the memory 130 may store the application 131.

The application 131 may be a series of programs (e.g., instructions) for performing at least one specific function. In the case where the application 131 is performed by the processor 110, after the instructions are loaded to the memory 130, the application 131 may be performed depending on the defined routine. An instruction may include not only a mechanical code generated by a compiler but also a high-level language code executable on a computer using an interpreter. The application 131 may be installed in the electronic device 100 through various ways. For example, the application 131 may include the preloaded application or the third party application downloadable from an external device.

The display 150 may include, for example, a liquid crystal display (LCD), a light-emitting diode (LED) display, an organic LED (OLED) display, a microelectromechanical systems (MEMS) display, or an electronic paper display. The display 150 may display various content (e.g., texts, images, videos, icons, symbols, or the like) to a user. The display 150 may include a touch screen and may receive, for example, a touch, gesture, proximity, or hovering input using an electronic pen or a part of a user's body.

The display 150 may include a panel 153 and a display driver IC (DDI) 151 configured to control the panel 153. The panel 153 may include a plurality of pixels, and each of the plurality of pixels may include sub-pixels (or lower pixels) displaying RGB, which is the three primary colors of light. Each of the sub-pixels may include at least one transistor and may adjust a pixel depending on a voltage applied to (or a current flows into) the transistor to express a color. The DDI 151 may include a gate driver circuit, which has an on/off function and controls a gate of a sub-pixel, and a source driver circuit that makes a difference in color by adjusting an image signal of the sub-pixel. The DDI 151 may adjust a transistor of the sub-pixel and may provide the entire screen. The DDI 151 may receive an image data from the processor 110 and may operate such that a video or image is displayed in the panel 153.

According to various embodiments, the panel 153 included in the display 150 may be implemented to be flat, flexible, or bendable. For another example, the panel 153 included in the display 150 may include one or more modules including a touch panel and/or a pen sensor.

According to an embodiment, the DDI 151 may output data assigned to (or stored in) a frame buffer to the panel 153. For another example, the DDI 151 may process scaling on data changed by the processor 110 depending on a resolution change and may output the scaled data to the panel 153. For example, if first data corresponding to the first resolution is changed to second data corresponding to the second resolution by the processor 110 and the second data is assigned to (or stored in) the frame buffer, the DDI 151 may scale the size of the second data to a size corresponding to the first resolution and may output the second data to the panel 153. As such, a user watches a screen, the resolution of which is changed, while a screen configuration (e.g., a UI) of the same size is maintained.

According to an embodiment, the scaling processing may be performed by a display control module 111 included in the processor 110. For example, the display control module 111 may process scaling on data changed by the processor 110 and may transmit the scaled data to the display 150. For example, the display control module 111 may perform a function the same as or similar to a function of the DDI 151.

According to an embodiment, the display 150 may output usable time (e.g., battery life) of the electronic device 100 depending on the change in the resolution of a screen. For example, while outputting a resolution configuration screen, the display 150 may output battery life during which the battery is capable of being used when the resolution of screen is changed to each resolution, battery life extended from current battery life when the resolution of screen is changed to each resolution, or the like.

According to an embodiment, in the case where the state of the electronic device 100 is changed or in the case where the specified application 131 is performed, the display 150 may provide a UI for allowing the user to select the resolution. For example, in the case where the state of the electronic device 100 is changed or in the case where the specified application 131 is performed, the display 150 may output the resolution configuration screen.

As described above, according to various embodiments, an electronic device (e.g., the electronic device 100) may include a display (e.g., the display 150) configured to output a screen, a display driver integrated circuit (IC) (e.g., the DDI 151) included in the display or electrically connected with the display, a memory (e.g., the memory 130) configured to store an application, and a processor (e.g., the processor 110) operatively connected with the display, the display driver IC, and the memory. The processor may be configured to transmit first data corresponding to a first screen of a first resolution to the display driver IC so as to output the first screen to the display, convert the first data into second data corresponding to a second screen of a second resolution different from the first resolution if a resolution change condition occurs, transmit the second data to the display driver IC, and adjust performance of a system resource included in the electronic device.

According to various embodiments, the resolution change condition may include at least one of a state where a battery level of the electronic device is not greater than a specified value, a state where an area to which data is assigned in the memory is not greater than a specified size, and a state where system resource usage of the application that is execution-requested is not less than a specified value.

According to various embodiments, the second resolution may be less than the first resolution.

According to various embodiments, an amount of the second data may be less than an amount of the first data.

According to various embodiments, the display driver IC may be further configured to change a size of the second screen corresponding to the second data such that the second screen corresponds to the first resolution, and output the changed second screen to the display.

According to various embodiments, the processor may be configured to adjust the performance of the system resource by changing at least one of a central processing unit (CPU) clock booster policy, a CPU governor policy, and a CPU scheduler policy.

According to various embodiments, the processor may be further configured to differently apply a resolution change to a process of the application depending on a state of the process of the application.

According to various embodiments, the processor may be configured to transmit a relevant instruction to the process of the application such that a user interface is output to be suitable for the second resolution, if the process of the application is at least one of a foreground process and a process registered in a whitelist managed by configuration.

According to various embodiments, the process registered in the whitelist may include at least one of a process, which continuously remains in an active state even though the process is in a background state, and a process needed to continuously remain in a current state for ease of use.

According to various embodiments, the process of the application receiving the instruction may be configured to change the user interface by relaunching a component for outputting the user interface, by adjusting a layout without relaunching the component, or by loading a resource suitable for the second resolution to the memory.

According to various embodiments, the processor may be configured to reset the process of the application if the process of the application is a background process or if the process of the application is the background process and remains in an inactive state during a specified time period or more.

According to various embodiments, the processor may be further configured to output a usable time of the electronic device, which is extended when the first resolution is changed to the second resolution, to the display.

According to various embodiments, the usable time of the electronic device may include battery life.

According to various embodiments, the processor may be further configured to provide a user interface for allowing a user to select a type of the second resolution, if the resolution change condition occurs.

Figure 2:
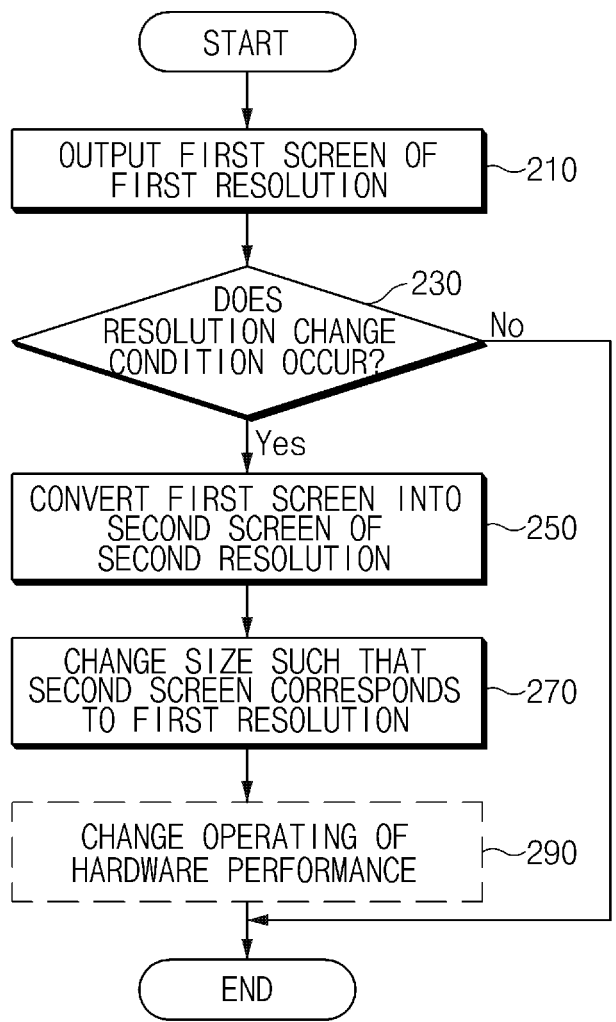
FIG. 2 is a flowchart illustrating an operating method of an electronic device associated with screen control, according to various embodiments of the disclosure.

FIG. 2 is a flowchart illustrating an operating method of an electronic device associated with screen control, according to various embodiments of the disclosure.

Referring to FIG. 2, in operation 210, an electronic device (e.g., the electronic device 100) may output a first screen having a first resolution to a display (e.g., the display 150).

In operation 230, the electronic device may determine whether a resolution change condition occurs. According to an embodiment, the electronic device may determine whether a state of the electronic device is changed, or whether an execution request of a specified application occurs (e.g., whether there is a request to execute an application). For example, the electronic device may determine the state of the electronic device by verifying a battery level, a storage space state of a memory (e.g., the memory 130), or the like. In the case where the state of the electronic device is in a state where a battery is low (e.g., a state where the battery level is not greater than a specified value), in a state where storage space of a memory is insufficient (e.g., a state where an area to which data is assigned or stored in the memory is not greater than a specified value), or the like, the electronic device may determine that the resolution change condition occurs. For another example, the electronic device may verify a type of the execution-requested application and may determine how much of a particular system resource of the electronic device is utilized by the application. For example, the electronic device may analyze meta information of the application, verify the type of the application, and determine the system resource used by the application, depending on the type of the application. In addition, the electronic device may extract a resource (e.g., a file such as an image, a video, an audio, or the like) included in the application to verify the size of the resource stored in the memory. In some embodiments, if it is determined that the application uses the system resource excessively, the electronic device may determine that the resolution change condition has occurred.

If the resolution change condition occurs, in operation 250, the electronic device may convert the first screen into a second screen having a second resolution. According to an embodiment, the electronic device may convert first data output to a screen corresponding to the first resolution into second data corresponding to (e.g., displayed at) the second resolution. For example, the electronic device may assign (or store) the second data, which is obtained by changing the first data, to (or in) a frame buffer to (or in) which the data to be output to the screen of the display is assigned (or stored).

According to an embodiment, in the case where the battery is low or in the case where the storage space of the memory is insufficient, the electronic device may lower the resolution of the screen. For another example, if system resource usage of the application is not less than a specified value, the electronic device may lower the resolution of the screen. For example, the electronic device may change the screen of the first resolution to the screen of the second resolution lower than the first resolution.

In the case where the resolution of the screen is lowered, an amount of the second data may be less than an amount of the first data. According to an embodiment, the electronic device may obtain the second data by merging or removing a part of the first data. Since an area to which the second data is assigned is less than an area to which the first data is assigned in the frame buffer, the amount of computation processed by a processor (e.g., the processor 110) may be reduced. As such, as the amount of processing processed by the processor decreases, battery consumption may decrease, and the amount of usage of the memory may also be reduced.

According to an embodiment, in the case where a state where the battery is low or a state where the storage space of the memory is insufficient is dissolved, the electronic device may lower the resolution of the screen. For another example, in the case where the specified application is ended, the electronic device may increase the resolution of the screen. For example, the electronic device may change the resolution of the screen from the second resolution to the first resolution.

In operation 270, the electronic device may change a display size such that the second screen corresponds to the first resolution. According to an embodiment, when outputting data assigned to (or stored in) the frame buffer to a panel (e.g., the panel 153) of the display, a DDI (e.g., the DDI 151) included in the display or electrically connected with the display may process scaling on the second data and may output the scaled data. For example, the DDI may scale the size of the second data to the size corresponding to the first resolution and may output the second data to the panel. As such, a user viewing a screen for which the resolution was changed will perceive the user interface configuration (e.g., a UI) being maintained at the same size.

According to various embodiments, while changing the resolution of the screen, in operation 290, the electronic device may change the operating of hardware performance. For example, when changing the resolution of the screen, the electronic device may adjust the performance of a system resource of the electronic device. The electronic device may change the operating of the system resource used to output data corresponding to the first resolution to the operating of the system resource for outputting changed data corresponding to the second resolution. According to an embodiment, the electronic device may change a CPU clock booster policy, a CPU governor policy, a CPU scheduler policy, or the like. For example, in the case where the second resolution is lower than the first resolution, the electronic device may reduce consumption of a battery by adjusting performance of the system resource.

Figure 3:
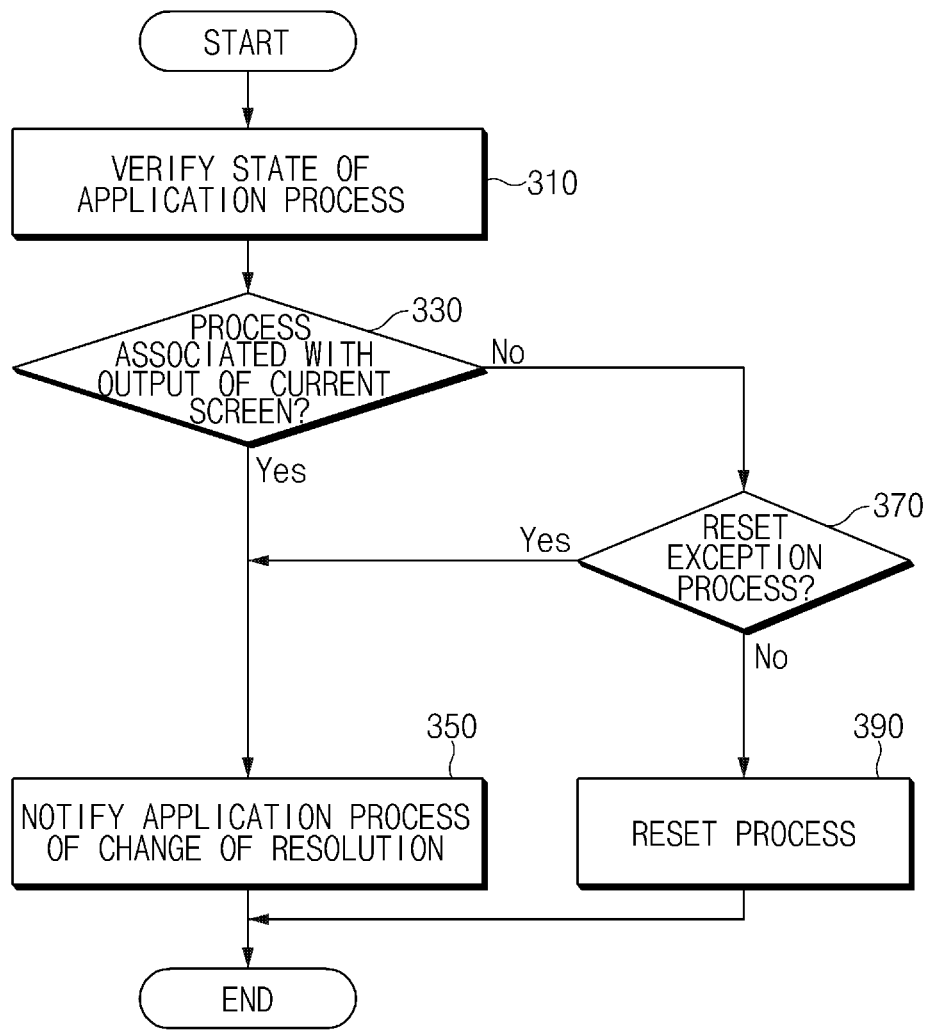
FIG. 3 is a flowchart illustrating an operating method of an electronic device associated with control of an application process, according to various embodiments of the disclosure.

FIG. 3 is a flowchart illustrating an operating method of an electronic device associated with control of an application process, according to various embodiments of the disclosure.

According to an embodiment, when changing a resolution of a screen, an electronic device (e.g., the electronic device 100) may apply a change in the resolution to an application process associated with the output of the screen. For example, the electronic device may control an application process such that the application process outputting a UI to a display (e.g., the display 150) outputs the UI in form suitable to the changed resolution.

Referring to FIG. 3, in operation 310, the electronic device (e.g., the electronic device 100) may verify a state of the application process. For example, the electronic device may determine whether the application process operates in a foreground or in a background. For another example, the electronic device may determine whether the application process is in an activate state or an inactive state. For another example, the electronic device may determine whether the application process is an application process managed by a configuration, for example, an application process registered in a whitelist.

In operation 330, the electronic device may determine whether the application process is associated with an output of a current screen. In the case where the application process is associated with the output of the current screen, then in operation 350, the electronic device may transmit a change notification (e.g., configuration change intent) indicating an impending change in resolution to the application process. According to an embodiment, when the application process is a foreground application process, the electronic device may perform operation 350.

According to an embodiment, when receiving the change notification of the resolution, the application process may change a UI by relaunching a UI component (e.g., rather than the entire application), adjusting a layout immediately without relaunching the UI component, or loading a resource suitable to the new resolution to a memory (e.g., the memory 130). As such, the continuity of the screen output may be preserved, preventing any visual interruptions, such as screen flickering.

When the application process is a process associated with the output of the current screen, in operation 370, the electronic device may determine whether the application process is a reset exception process. The reset exception process may include an application process managed or otherwise preconfigured so as not to be reset. For example, the reset exception process may include an application process registered in the 'whitelist.' For example, the application process registered in the whitelist may include an application process (e.g., a process of a music playing application), which remains in an active state during a specified time period or more, from among background application processes, an application process (e.g., a Bluetooth connection manager) needed to continuously remain in a current state for ease of use, or the like.

In the case where the application process is the reset exception process, the electronic device may perform operation 350. When the application process is not the reset exception process, in operation 390, the electronic device may reset the application process. According to an embodiment, when the application process is a background application process, the electronic device may perform operation 390. In another example, when the application process remains in an inactive state for a specified time period or more, and the application process is the background application process, the electronic device may perform operation 390.

As described above, according to various embodiments, a screen controlling method of an electronic device may include outputting a first screen of a first resolution to a display, changing the first screen to a second screen of a second resolution different from the first resolution if a resolution change condition occurs, and adjusting performance of a system resource included in the electronic device.

According to various embodiments, the resolution change condition may include at least one of a state where a battery level of the electronic device is not greater than a specified value, a state where an area to which data is assigned in a memory is not greater than a specified size, and a state where system resource usage of the application that is execution-requested is not less than a specified value.

According to various embodiments, the screen controlling method may further include changing a size of the second screen such that the second screen corresponds to the first resolution, and outputting the changed second screen to the display.

According to various embodiments, the changing of the first screen to the second screen may include transmitting a relevant instruction to a process of an application such that a user interface is output to be suitable for the second resolution, if the process of the application is at least one of a foreground process and a process registered in a whitelist managed by configuration.

According to various embodiments, the changing of the first screen to the second screen may include resetting a process of an application if the process of the application is a background process or if the process of the application is the background process and remains in an inactive state during a specified time period or more.

According to various embodiments, the screen controlling method may further include outputting a usable time of the electronic device that is extended when the first resolution is changed to the second resolution.

FIG. 4 is a screen view for describing a resolution change of a screen, according to various embodiments of the disclosure.

Referring to FIG. 4, an electronic device (e.g., the electronic device 100) may change a resolution of a screen depending on a state of the electronic device, a type of an application, or the like. For example, the electronic device may change a first screen 410 of a first resolution 471 (e.g., wide quad high definition or "WQHD" at a resolution of 1440×2560 pixels) to a second screen 430 of a second resolution 473 (e.g., full high definition or "FHD" and 1080×1920 pixels) or a third screen 450 of a third resolution 475 (e.g., high definition or "HD" at 730×1280 pixels). However, the changed resolution is not limited thereto. According to various embodiments, the resolution may be changed to another resolution in addition to the above-described resolutions.

According to an embodiment, if first data corresponding to the first resolution 471 is changed to second data corresponding to the second resolution 473 or third data corresponding to the third resolution 475 by a processor (e.g., the processor 110) and the second data or the third data is assigned to a (stored in) frame buffer, a DDI (e.g., the DDI 151) may scale the second data or the third data to a size corresponding to the first resolution 471 and may output the second data or the third data, the size of which is changed, to a panel (e.g., the panel 153). As such, as illustrated in FIG. 4, as a viewer views a screen for which, the resolution is changed, a displayed screen configuration (e.g., a UI) is maintained at a consistent same size.

According to an embodiment, the electronic device may output a usable time (e.g., battery life) of the electronic device, which is based on a resolution, to a screen of each resolution. For example, the electronic device may output battery life 411, which is based on the first resolution 471, to the first screen 410, may output battery life 431, which is based on the second resolution 473, to the second screen 430, and may output battery life 451, which is based on the third resolution 475, to the third screen 450. As illustrated in FIG. 4, the electronic device may display battery life, which is based on each resolution, to an indicator of a screen.

According to an embodiment, the electronic device may calculate a usable time of the electronic device based on at least one of information about a battery consumed during a specific time period, use pattern data of a system resource of the electronic device, and a battery level. For another example, the electronic device may continuously calculate a battery level through a separate hardware device that verifies a consumed current for each system resource of the electronic device.

FIG. 5 is a table for describing a state of an application process, according to various embodiments of the disclosure.

The table illustrated in FIG. 5 may indicate a state list of an application process for process management in an android OS-based system. However, the illustrated table is an example for describing a state 510 of the application process, and the state 510 of the application process is not limited thereto. However, it is understood by those skilled in the art that the state 510 of the application process is changed depending on a type of an OS.

According to an embodiment, the state 510 of the application process may be managed for each level. For example, the state 510 of the application process may be classified and managed as a level depending on a characteristic 530 of the application process. As illustrated in FIG. 5, it is illustrated that the state 510 of the application process is classified as a first level (e.g., an identification number="0") in the case where the characteristic 530 of the application process corresponds to a system process, and the state 510 of the application process is classified as a second level (e.g., an identification number="1") in the case where the characteristic 530 of the application process is a UI process while being a system process. As such, the application process may be classified and managed as the level depending on the characteristic 530, for example, whether the application process is a system process, a UI process, a highest layer process, a foreground service process, a process important to a user, or the like.

According to an embodiment, in the case where the characteristic 530 of an application process is a system process (a first level), a UI process (a second level) while being the system process, the highest layer process (a third level), a foreground service process (a fourth level) associated with a system, or a foreground service process (a fifth level), the application process may be a foreground process 551. Otherwise, the application process may be a background process 553.

Figure 6:
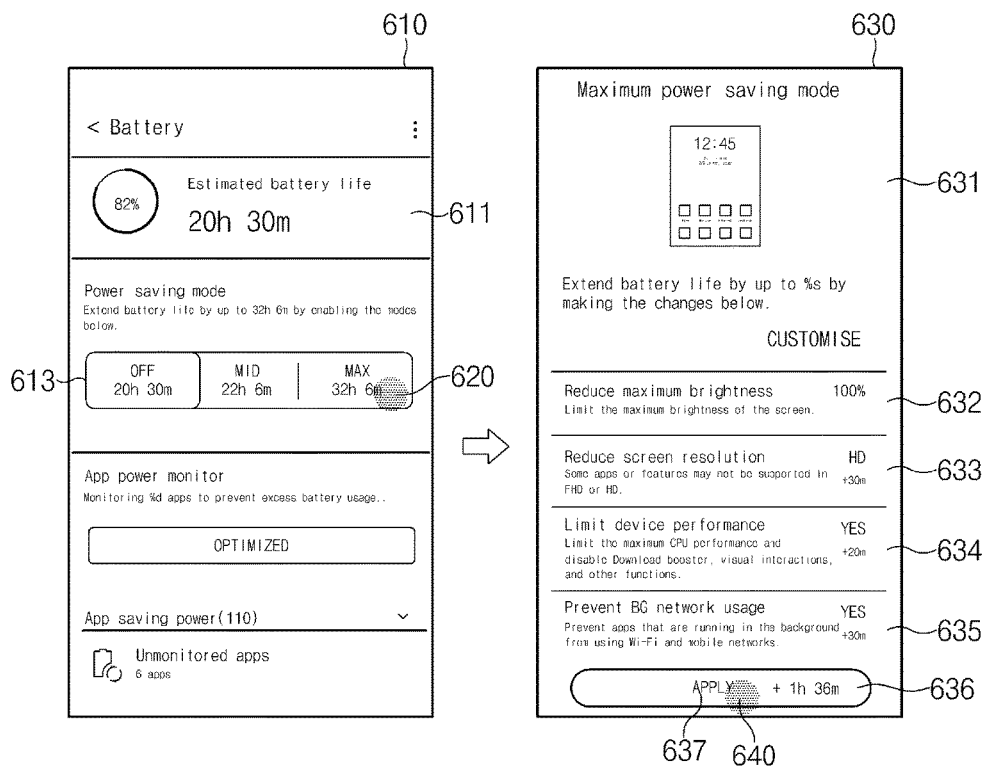
FIG. 6 is a view illustrating a battery performance adjustment screen, according to various embodiments of the disclosure.

FIG. 6 is a view illustrating a battery performance adjustment screen, according to various embodiments of the disclosure.

Referring to FIG. 6, an electronic device (e.g., the electronic device 100) may output a battery performance adjustment screen 610 to a display (e.g., the display 150) to allow a user to execute configuration changes for adjusting battery performance. The battery performance adjustment screen 610 may include current battery life 611, battery life 613 extension selectors in which the battery performance may be adjusted, and the like. For another example, the battery life 613 extension selectors in which the battery performance may be adjusted may include one or more buttons (or icons) selectable to adjust performance of each battery.

According to an embodiment, if an input 620 is detected selecting the button to adjust performance of each battery, the electronic device may output a battery detail performance screen 630 including details regarding performance of the selected battery to a display. The battery detail performance screen 630 may include a preview 631 displaying how a screen will be displayed when the performance of the battery is adjusted, a brightness adjustment button 632, a resolution change button 633, a system resource performance adjustment button 634, a button 635 for selecting whether a network is used, battery life 636 extended when the detailed performance of the battery is adjusted, a button 637 for applying adjustment of the detail performance of the battery, or the like. If an input 640 for selecting the button 637 for applying adjustment of the detail performance of the battery is generated, the electronic device may adjust the detailed performance of the battery.

Figure 7:
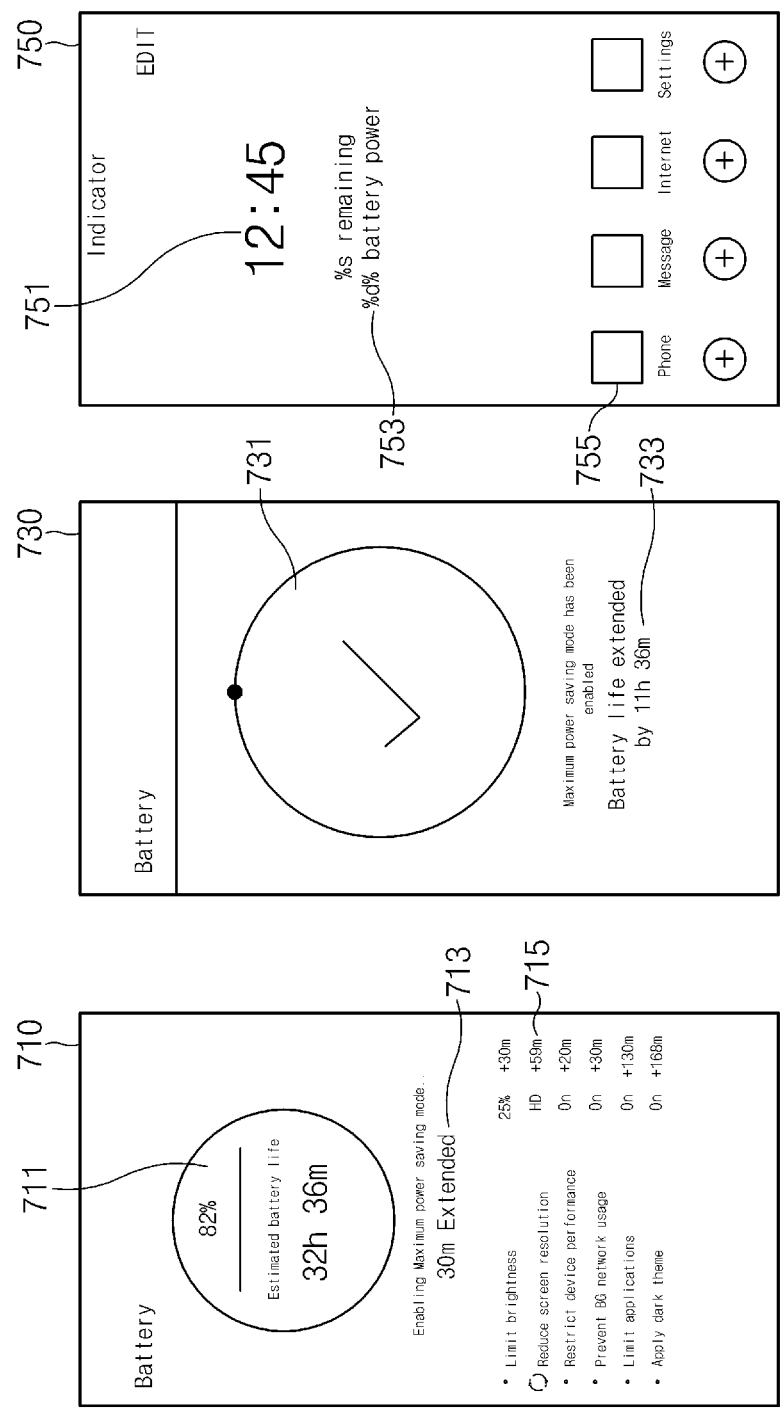
FIG. 7 is a view for describing a screen in which battery performance is adjusted, according to various embodiments of the disclosure.

FIG. 7 is a view for describing a screen in which battery performance is adjusted, according to various embodiments of the disclosure.

Referring to FIG. 7, an electronic device (e.g., the electronic device 100) may output a screen 750, in which performance of a battery may be adjusted, to a display (e.g., the display 150). For example, if the input 640 is detected selecting the button 637 to apply adjustment of the detail performance of the battery illustrated in FIG. 6, the electronic device may output a system resource update screen 710 to a display while the detailed performance of the battery is adjusted. The system resource update screen 710 may include battery life indicator 711, an estimated battery life 713 extended time operative when the performance of the battery is adjusted, battery life 715 extended time operative depending on performance adjustment of each particular system resource, or the like.

According to an embodiment, if the system resource update screen 710 is output and performance adjustment of each system resource is completed, or if a specified time period expires, the electronic device may output a system resource performance adjustment completion screen 730 for notifying a user that the performance adjustment of the system resource is completed. The system resource performance adjustment completion screen 730 may include a performance adjustment result image 731 of the system resource, battery life 733 extended depending on the performance adjustment of all system resources, or the like.

According to an embodiment, if the system resource performance adjustment completion screen 730 is output and the specified time period expires, the electronic device may output a screen 750 to a display, in which performance of the battery is adjusted. The screen 750 in which the performance of the battery is adjusted may include current time 751, battery life 753, or various types of execution icons 755, or the like.

Figure 8:
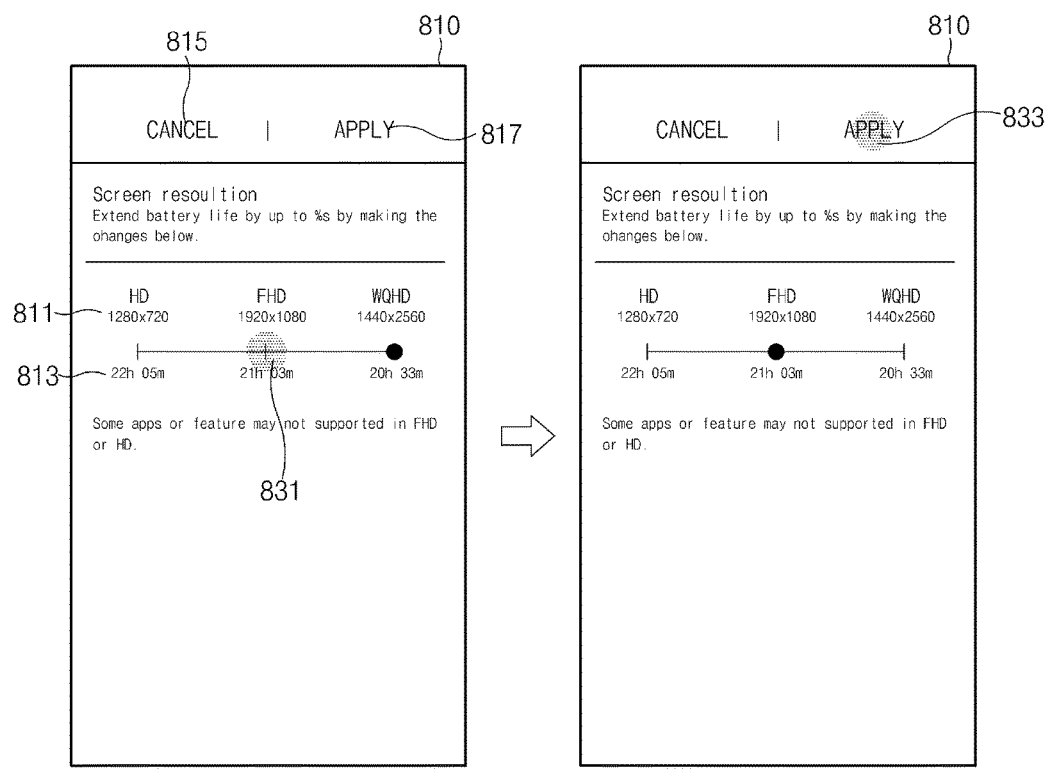
FIG. 8 is a view illustrating a resolution configuration screen, according to various embodiments of the disclosure.

FIG. 8 is a view illustrating a resolution configuration screen, according to various embodiments of the invention.

Referring to FIG. 8, an electronic device (e.g., the electronic device 100) may output a resolution configuration screen 810 to a display (e.g., the display 150) allowing a user to set a resolution. The resolution configuration screen 810 may include one or more resolutions 811 that the electronic device is capable of supporting, an extended battery life time 813 operative when the resolution is changed to each resolution, a resolution change cancellation button 815, a resolution change button 817, and the like.

According to an embodiment, if an input 833 is detected selecting the resolution change button 817 after an input 831 is detected selecting one of the supported resolutions, the electronic device may change a screen resolution of the display.

Figure 9:
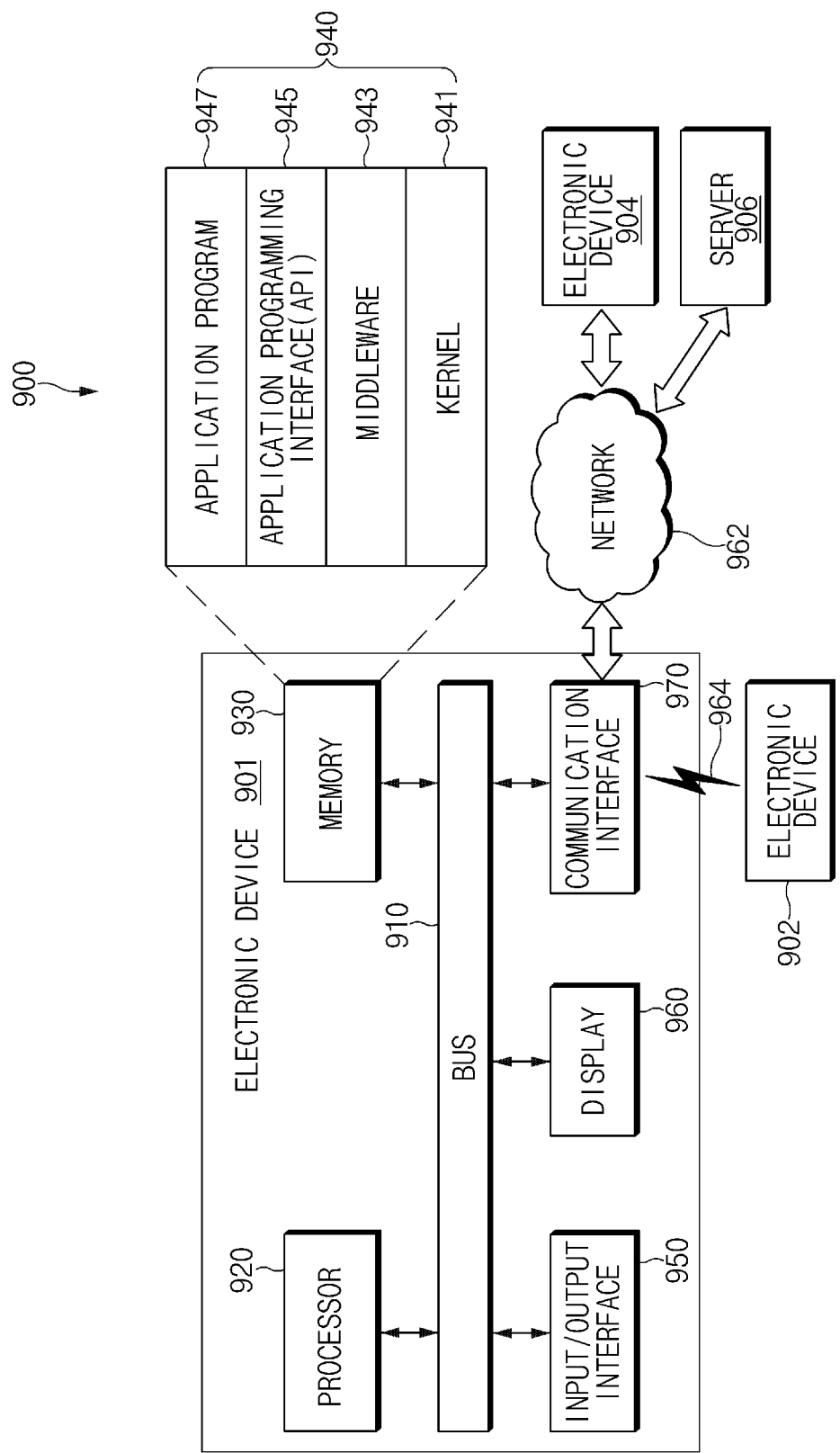
FIG. 9 illustrates an electronic device in a network environment according to various embodiments of the disclosure.

FIG. 9 illustrates an electronic device in a network environment according to an embodiment of the present disclosure.

An electronic device 901 in a network environment 900 according to various embodiments of the present disclosure will be described with reference to FIG. 9. The electronic device 901 may include a bus 910, a processor 920, a memory 930, an input/output interface 950, a display 960, and a communication interface 970. In various embodiments of the present disclosure, at least one of the foregoing elements may be omitted or another element may be added to the electronic device 901.

The bus 910 may include a circuit for connecting the above-mentioned elements 910 to 970 to each other and transferring communications (e.g., control messages and/or data) among the above-mentioned elements.

The processor 920 may include at least one of a central processing unit (CPU), an application processor (AP), or a communication processor (CP). The processor 920 may perform data processing or an operation related to communication and/or control of at least one of the other elements of the electronic device 901.

The memory 930 may include a volatile memory and/or a nonvolatile memory. The memory 930 may store instructions or data related to at least one of the other elements of the electronic device 901. According to an embodiment of the present disclosure, the memory 930 may store software and/or a program 940. The program 940 may include, for example, a kernel 941, a middleware 943, an application programming interface (API) 945, and/or an application program (or an application) 947. At least a portion of the kernel 941, the middleware 943, or the API 945 may be referred to as an operating system (OS).

The kernel 941 may control or manage system resources (e.g., the bus 910, the processor 920, the memory 930, or the like) used to perform operations or functions of other programs (e.g., the middleware 943, the API 945, or the application program 947). Furthermore, the kernel 941 may provide an interface for allowing the middleware 943, the API 945, or the application program 947 to access individual elements of the electronic device 901 in order to control or manage the system resources.

The middleware 943 may serve as an intermediary so that the API 945 or the application program 947 communicates and exchanges data with the kernel 941.

Furthermore, the middleware 943 may handle one or more task requests received from the application program 947 according to a priority order. For example, the middleware 943 may assign at least one application program 947 a priority for using the system resources (e.g., the bus 910, the processor 920, the memory 930, or the like) of the electronic device 901. For example, the middleware 943 may handle the one or more task requests according to the priority assigned to the at least one application, thereby performing scheduling or load balancing with respect to the one or more task requests.

The API 945, which is an interface for allowing the application 947 to control a function provided by the kernel 941 or the middleware 943, may include, for example, at least one interface or function (e.g., instructions) for file control, window control, image processing, character control, or the like.

The input/output interface 950 may serve to transfer an instruction or data input from a user or another external device to (an)other element(s) of the electronic device 901. Furthermore, the input/output interface 950 may output instructions or data received from (an)other element(s) of the electronic device 901 to the user or another external device.

The display 960 may include, for example, a liquid crystal display (LCD), a light-emitting diode (LED) display, an organic light-emitting diode (OLED) display, a microelectromechanical systems (MEMS) display, or an electronic paper display. The display 960 may present various content (e.g., a text, an image, a video, an icon, a symbol, or the like) to the user. The display 960 may include a touch screen, and may receive a touch, gesture, proximity or hovering input from an electronic pen or a part of a body of the user.

The communication interface 970 may set communications between the electronic device 901 and an external device (e.g., a first external electronic device 902, a second external electronic device 904, or a server 906). For example, the communication interface 970 may be connected to a network 962 via wireless communications or wired communications so as to communicate with the external device (e.g., the second external electronic device 904 or the server 906).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 964. The short-range communications may include at least one of wireless fidelity (Wi-Fi), Bluetooth, near field communication (NFC), magnetic stripe transmission (MST), or GNSS.

The MST may generate pulses according to transmission data and the pulses may generate electromagnetic signals. The electronic device 901 may transmit the electromagnetic signals to a reader device such as a POS (point of sales) device. The POS device may detect the magnetic signals by using a MST reader and restore data by converting the detected electromagnetic signals into electrical signals.

The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 232 (RS-232), plain old telephone service (POTS), or the like. The network 962 may include at least one of telecommunications networks, for example, a computer network (e.g., local area network (LAN) or wide area network (WAN)), the Internet, or a telephone network.

The types of the first external electronic device 902 and the second external electronic device 904 may be the same as or different from the type of the electronic device 901. According to an embodiment of the present disclosure, the server 906 may include a group of one or more servers. A portion or all of operations performed in the electronic device 901 may be performed in one or more other electronic devices (e.g., the first electronic device 902, the second external electronic device 904, or the server 906). When the electronic device 901 should perform a certain function or service automatically or in response to a request, the electronic device 901 may request at least a portion of functions related to the function or service from another device (e.g., the first electronic device 902, the second external electronic device 904, or the server 906) instead of or in addition to performing the function or service for itself. The other electronic device (e.g., the first electronic device 902, the second external electronic device 904, or the server 906) may perform the requested function or additional function, and may transfer a result of the performance to the electronic device 901. The electronic device 901 may use a received result itself or additionally process the received result to provide the requested function or service. To this end, for example, a cloud computing technology, a distributed computing technology, or a client-server computing technology may be used.

Figure 10:
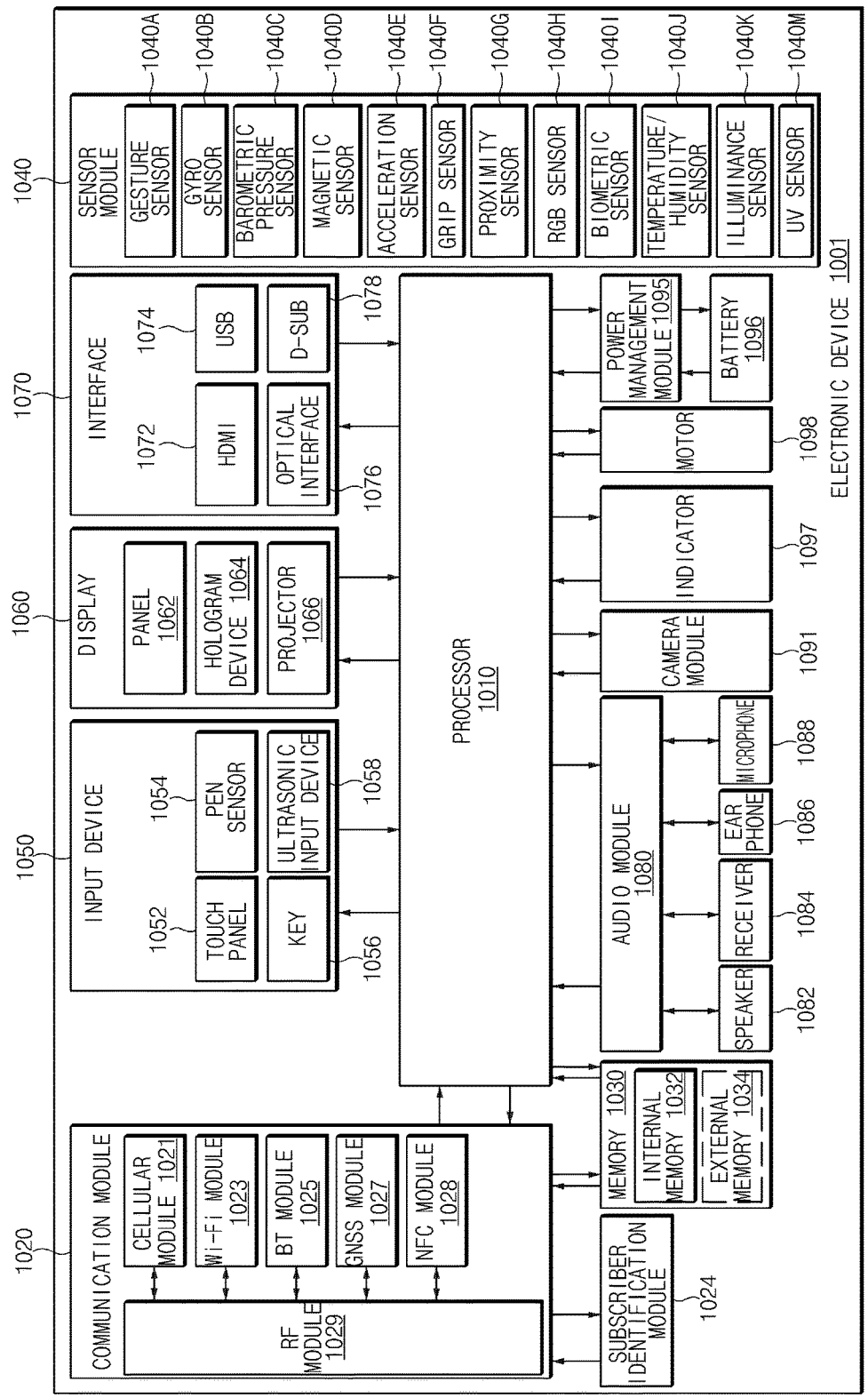
FIG. 10 is a block diagram illustrating an electronic device according to various embodiments of the disclosure.

FIG. 10 is a block diagram illustrating an electronic device according to an embodiment of the present disclosure.

Referring to FIG. 10, an electronic device 1001 may include, for example, a part or the entirety of the electronic device 901 illustrated in FIG. 9. The electronic device 1001 may include at least one processor (e.g., AP) 1010, a communication module 1020, a subscriber identification module (SIM) 1024, a memory 1030, a sensor module 1040, an input device 1050, a display 1060, an interface 1070, an audio module 1080, a camera module 1091, a power management module 1095, a battery 1096, an indicator 1097, and a motor 1098.

The processor 1010 may run an operating system or an application program so as to control a plurality of hardware or software elements connected to the processor 1010, and may process various data and perform operations. The processor 1010 may be implemented with, for example, a system on chip (SoC). According to an embodiment of the present disclosure, the processor 1010 may further include a graphic processing unit (GPU) and/or an image signal processor. The processor 1010 may include at least a portion (e.g., a cellular module 1021) of the elements illustrated in FIG. 10. The processor 1010 may load, on a volatile memory, an instruction or data received from at least one of other elements (e.g., a nonvolatile memory) to process the instruction or data, and may store various data in a nonvolatile memory.

The communication module 1020 may have a configuration that is the same as or similar to that of the communication interface 970 of FIG. 9. The communication module 1020 may include, for example, a cellular module 1021, a Wi-Fi module 1023, a Bluetooth (BT) module 1025, a GNSS module 1027 (e.g., a GPS module, a GLONASS module, a BeiDou module, or a Galileo module), a NFC module 1028, and a radio frequency (RF) module 1029.

The cellular module 1021 may provide, for example, a voice call service, a video call service, a text message service, or an Internet service through a communication network. The cellular module 1021 may identify and authenticate the electronic device 1001 in the communication network using the subscriber identification module 1024 (e.g., a SIM card). The cellular module 1021 may perform at least a part of functions that may be provided by the processor 1010. The cellular module 1021 may include a communication processor (CP).

Each of the Wi-Fi module 1023, the Bluetooth module 1025, the GNSS module 1027 and the NFC module 1028 may include, for example, a processor for processing data transmitted/received through the modules. According to some various embodiments of the present disclosure, at least a part (e.g., two or more) of the cellular module 1021, the Wi-Fi module 1023, the Bluetooth module 1025, the GNSS module 1027, and the NFC module 1028 may be included in a single integrated chip (IC) or IC package.

The RF module 1029 may transmit/receive, for example, communication signals (e.g., RF signals). The RF module 1029 may include, for example, a transceiver, a power amp module (PAM), a frequency filter, a low noise amplifier (LNA), an antenna, or the like. According to another embodiment of the present disclosure, at least one of the cellular module 1021, the Wi-Fi module 1023, the Bluetooth module 1025, the GNSS module 1027, or the NFC module 1028 may transmit/receive RF signals through a separate RF module.

The SIM 1024 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 1030 (e.g., the memory 930) may include, for example, an internal memory 1032 or an external memory 1034. The internal memory 1032 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 1034 may include a flash drive such as a compact flash (CF), a secure digital (SD), a Micro-SD, a Mini-SD, an extreme digital (xD), a MultiMediaCard (MMC), a memory stick, or the like. The external memory 1034 may be operatively and/or physically connected to the electronic device 1001 through various interfaces.

The sensor module 1040 may, for example, measure physical quantity or detect an operation state of the electronic device 1001 so as to convert measured or detected information into an electrical signal. The sensor module 1040 may include, for example, at least one of a gesture sensor 1040A, a gyro sensor 1040B, a barometric pressure sensor 1040C, a magnetic sensor 1040D, an acceleration sensor 1040E, a grip sensor 1040F, a proximity sensor 1040G, a color sensor 1040H (e.g., a red/green/blue (RGB) sensor), a biometric sensor 1040I, a temperature/humidity sensor 1040J, an illumination sensor 1040K, or an ultraviolet (UV) sensor 1040M. Additionally or alternatively, the sensor module 1040 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1040 may further include a control circuit for controlling at least one sensor included therein. In some various embodiments of the present disclosure, the electronic device 1001 may further include a processor configured to control the sensor module 1040 as a part of the processor 1010 or separately, so that the sensor module 1040 is controlled while the processor 1010 is in a sleep state.

The input device 1050 may include, for example, a touch panel 1052, a (digital) pen sensor 1054, a key 1056, or an ultrasonic input device 1058. The touch panel 1052 may employ at least one of capacitive, resistive, infrared, and ultraviolet sensing methods. The touch panel 1052 may further include a control circuit. The touch panel 1052 may further include a tactile layer so as to provide a haptic feedback to a user.

The (digital) pen sensor 1054 may include, for example, a sheet for recognition which is a part of a touch panel or is separate. The key 1056 may include, for example, a physical button, an optical button, or a keypad. The ultrasonic input device 1058 may sense ultrasonic waves generated by an input tool through a microphone 1088 so as to identify data corresponding to the ultrasonic waves sensed.

The display 1060 (e.g., the display 960) may include a panel 1062, a hologram device 1064, or a projector 1066. The panel 1062 may have a configuration that is the same as or similar to that of the display 960 of FIG. 9. The panel 1062 may be, for example, flexible, transparent, or wearable. The panel 1062 and the touch panel 1052 may be integrated into a single module. The hologram device 1064 may display a stereoscopic image in a space using a light interference phenomenon. The projector 1066 may project light onto a screen so as to display an image. The screen may be disposed in the inside or the outside of the electronic device 1001. According to an embodiment of the present disclosure, the display 1060 may further include a control circuit for controlling the panel 1062, the hologram device 1064, or the projector 1066.

The interface 1070 may include, for example, an HDMI 1072, a USB 1074, an optical interface 1076, or a D-sub-miniature (D-sub) 1078. The interface 1070, for example, may be included in the communication interface 970 illustrated in FIG. 9. Additionally or alternatively, the interface 1070 may include, for example, a mobile high-definition link (MHL) interface, an SD card/multi-media card (MMC) interface, or an infrared data association (IrDA) interface.

The audio module 1080 may convert, for example, a sound into an electrical signal or vice versa. At least a portion of elements of the audio module 1080 may be included in the input/output interface 950 illustrated in FIG. 9. The audio module 1080 may process sound information input or output through a speaker 1082, a receiver 1084, an earphone 1086, or the microphone 1088.

The camera module 1091 is, for example, a device for shooting a still image or a video. According to an embodiment of the present disclosure, the camera module 1091 may include at least one image sensor (e.g., a front sensor or a rear sensor), a lens, an image signal processor (ISP), or a flash (e.g., an LED or a xenon lamp).

The power management module 1095 may manage power of the electronic device 1001. According to an embodiment of the present disclosure, the power management module 1095 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1096 and a voltage, current or temperature thereof while the battery is charged. The battery 1096 may include, for example, a rechargeable battery and/or a solar battery.

The indicator 1097 may display a specific state of the electronic device 1001 or a part thereof (e.g., the processor 1010), such as a booting state, a message state, a charging state, or the like. The motor 1098 may convert an electrical signal into a mechanical vibration, and may generate a vibration or haptic effect. Although not illustrated, a processing device (e.g., a GPU) for supporting a mobile TV may be included in the electronic device 1001. The processing device for supporting a mobile TV may process media data according to the standards of digital multimedia broadcasting (DMB), digital video broadcasting (DVB), Media-FLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

Figure 11:
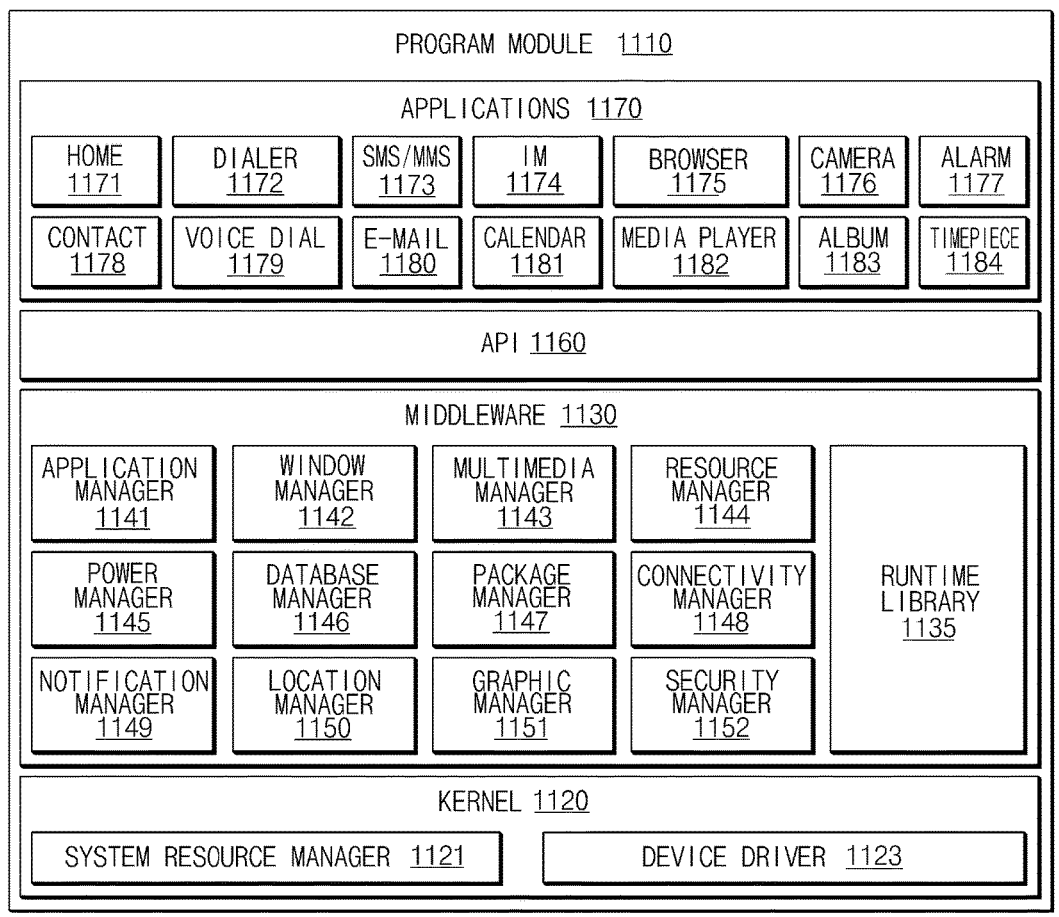
FIG. 11 is a block diagram illustrating a program module according to various embodiments of the disclosure.

FIG. 11 is a block diagram illustrating a program module according to an embodiment of the present disclosure.

Referring to FIG. 11, a program module 1110 (e.g., the program 940) may include an operating system (OS) for controlling a resource related to an electronic device (e.g., the electronic device 901) and/or various applications (e.g., the application program 947) running on the OS. The operating system may be, for example, Android, iOS, Windows, Symbian, Tizen, or the like.

The program module 1110 may include a kernel 1120, a middleware 1130, an API 1160, and/or an application 1170. At least a part of the program module 1110 may be preloaded on an electronic device or may be downloaded from an external electronic device (e.g., the first electronic device 902, the second external electronic device 904, or the server 906).

The kernel 1120 (e.g., the kernel 941) may include, for example, a system resource manager 1121 or a device driver 1123. The system resource manager 1121 may perform control, allocation, or retrieval of a system resource. According to an embodiment of the present disclosure, the system resource manager 1121 may include a process management unit, a memory management unit, a file system management unit, or the like. The device driver 1123 may include, for example, a display driver, a camera driver, a Bluetooth driver, a shared memory driver, a USB driver, a keypad driver, a Wi-Fi driver, an audio driver, or an inter-process communication (IPC) driver.

The middleware 1130, for example, may provide a function that the applications 1170 utilize in common, or may provide various functions to the applications 1170 through the API 1160 so that the applications 1170 may efficiently use limited system resources in the electronic device. According to an embodiment of the present disclosure, the middleware 1130 (e.g., the middleware 943) may include at least one of a runtime library 1135, an application manager 1141, a window manager 1142, a multimedia manager 1143, a resource manager 1144, a power manager 1145, a database manager 1146, a package manager 1147, a connectivity manager 1148, a notification manager 1149, a location manager 1150, a graphic manager 1151, and a security manager 1152.

The runtime library 1135 may include, for example, a library module that a complier uses to add a new function through a programming language while the application 1170 is running. The runtime library 1135 may perform a function for input/output management, memory management, or an arithmetic function.

The application manager 1141 may mange, for example, a life cycle of at least one of the applications 1170. The window manager 1142 may manage a GUI resource used in a screen. The multimedia manager 1143 may recognize a format utilized for playing various media files and may encode or decode a media file using a codec matched to the format. The resource manager 1144 may manage a resource such as a source code, a memory, or a storage space of at least one of the applications 1170.

The power manager 1145, for example, may operate together with a basic input/output system (BIOS) to manage a battery or power and may provide power information utilized for operating the electronic device. The database manager 1146 may generate, search, or modify a database to be used in at least one of the applications 1170. The package manager 1147 may manage installation or update of an application distributed in a package file format.

The connectivity manager 1148 may manage wireless connection of Wi-Fi, Bluetooth, or the like. The notification manager 1149 may display or notify an event such as message arrival, appointments, and proximity alerts in such a manner as not to disturb a user. The location manager 1150 may manage location information of the electronic device. The graphic manager 1151 may manage a graphic effect to be provided to a user or a user interface related thereto. The security manager 1152 may provide various security functions utilized for system security or user authentication. According to an embodiment of the present disclosure, in the case in which an electronic device (e.g., the electronic device 901) includes a phone function, the middleware 1130 may further include a telephony manager for managing a voice or video call function of the electronic device.

The middleware 1130 may include a middleware module for forming a combination of various functions of the above-mentioned elements. The middleware 1130 may provide a module specialized for each type of an operating system to provide differentiated functions. Furthermore, the middleware 1130 may delete a part of existing elements or may add new elements dynamically.

The API 1160 (e.g., the API 945) which is, for example, a set of API programming functions may be provided in different configurations according to an operating system. For example, in the case of Android or iOS, one API set may be provided for each platform, and, in the case of Tizen, at least two API sets may be provided for each platform.

The application 1170 (e.g., the application program 947), for example, may include at least one application capable of performing functions such as a home 1171, a dialer 1172, an SMS/MMS 1173, an instant message (IM) 1174, a browser 1175, a camera 1176, an alarm 1177, a contact 1178, a voice dial 1179, an e-mail 1180, a calendar 1181, a media player 1182, an album 1183, a clock 1184, health care (e.g., measure an exercise amount or blood sugar), or environmental information provision (e.g., provide air pressure, humidity, or temperature information).

According to an embodiment of the present disclosure, the application 1170 may include an information exchange application for supporting information exchange between the electronic device (e.g., the electronic device 901) and an external electronic device (e.g., the first electronic device 902 or the second external electronic device 904). The information exchange application may include, for example, a notification relay application for relaying specific information to the external electronic device or a device management application for managing the external electronic device.

For example, the notification relay application may have a function for relaying, to an external electronic device (e.g., the first electronic device 902 or the second external electronic device 904), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device (e.g., the first electronic device 902 or the second external electronic device 904) communicating with the electronic device, an application running in the external electronic device, or a service (e.g., a call service, a message service, or the like) provided from the external electronic device.

According to an embodiment of the present disclosure, the application 1170 may include a specified application (e.g., a healthcare application of a mobile medical device) according to an attribute of the external electronic device (e.g., the first electronic device 902 or the second external electronic device 904). The application 1170 may include an application received from an external electronic device (e.g., the first electronic device 902 or the second external electronic device 904). The application 1170 may include a preloaded application or a third-party application downloadable from a server. The names of the elements of the program module 1110 illustrated may vary with the type of an operating system.

According to various embodiments of the present disclosure, at least a part of the program module 1110 may be implemented with software, firmware, hardware, or a combination thereof. At least a part of the program module 1110, for example, may be implemented (e.g., executed) by a processor (e.g., the processor 1010). At least a part of the program module 1110 may include, for example, a module, a program, a routine, sets of instructions, or a process for performing at least one function.

According to various embodiments of the present disclosure, convenience may be provided by changing a resolution of a screen depending on a state of an electronic device or a type of an application without a configuration operation of a user.

In addition, according to various embodiments of the present disclosure, efficiency of a system resource may increase by adjusting the performance of a system resource as well as the resolution of a screen.

Furthermore, according to various embodiments of the present disclosure, a screen may provide continuity of a screen output by differently processing control of an application process on a change in a resolution depending on the state of the application process.

Besides, a variety of effects directly or indirectly understood through this disclosure may be provided.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 920), the processor may perform functions corresponding to the instructions. The computer-readable storage medium may be, for example, the memory 930.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

The control unit or processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

While the present disclosure has been shown and described with reference to certain embodiments thereof, it will be understood by those skilled in the art that various changes in form and details may be made therein without departing from the present disclosure. Therefore, the present disclosure should not be defined as being limited to the embodiments, but should be defined by the appended claims and equivalents thereof.

What is claimed is:

1. An electronic device comprising:
a display configured to display a screen;
a display driver integrated circuit (IC) included in the display or electrically coupled with the display;
a memory configured to store an application; and
a processor operatively coupled with the display, the display driver IC, and the memory, configured to:
transmit first data corresponding to a first screen in a first resolution to the display driver IC to output the first screen to the display;
when a resolution change condition is detected, convert the first data into second data corresponding to a second screen in a second resolution which is different from the first resolution, and transmit the second data to the display driver IC to output the second screen to the display; and
adjust a max clock of the processor and time duration in the max clock in accordance with the second resolution.

2. The electronic device of claim 1, wherein detecting the resolution change condition includes detecting at least one of:
a battery level of the electronic device being less than a specified value,
an area in the memory to which data is assigned being less than a first specified size, and
a size of a resource corresponding to the application in the memory being greater than a second specified size.

3. The electronic device of claim 1, wherein the second resolution of a lower resolution than the first resolution.

4. The electronic device of claim 3, wherein a data size of the second data is less than a data size of the first data.

5. The electronic device of claim 1, wherein the processor is further configured to:
change, by the display driver IC, a size of the second screen such that the second screen matches a display size of the first screen displayed at the first resolution, wherein the second screen is output to the display utilizing the changed size.

6. The electronic device of claim 1, wherein the processor is further configured to:
adjust performance of a system resource by changing at least one of a central processing unit (CPU) clock booster policy, a CPU governor policy, and a CPU scheduler policy.

7. The electronic device of claim 1, wherein the processor is further configured to:
apply a resolution change to a process of the application depending on a state of the process of the application.

8. The electronic device of claim 7, wherein the processor is configured to:
when the process is at least one of a foreground process and a process registered in a preconfigured list, transmit an instruction to the process of the application causing a user interface is output according to the second resolution.

9. The electronic device of claim 8, wherein the process includes at least one of
a process maintained in an active state even while in a background state, and
a process set to not be terminated for at least a predetermined time period.

10. The electronic device of claim 8,
wherein outputting the user interface further comprises:
relaunching a component of the user interface,
adjusting a layout of the user interface, or
loading a resource corresponding to the second resolution to the memory.

11. The electronic device of claim 7, wherein the processor is configured to execute at least one of:
reset the process when the process of the application is a background process, and
reset the process when the process is the background process and remains in an inactive state for at least a predetermined time period.

12. The electronic device of claim 1, wherein the processor is further configured to:
control the display to display a remaining usable time of the electronic device that is updated to reflect an extended remaining usable time when the first resolution is changed to the second resolution.

13. The electronic device of claim 12, wherein the remaining usable time of the electronic device includes a remaining battery life of the electronic device.

14. The electronic device of claim 1, wherein the processor is further configured to:
control the display to display a user interface including options selectable to indicate a desired resolution, when the resolution change condition is detected.

15. A screen controlling method of an electronic device, the method comprising:
outputting a first screen to a display in a first resolution;
when a resolution change condition is detected by a processor, changing the first screen to display a second screen in a second resolution which is different from the first resolutions; and
adjusting a max clock of the processor and time duration in the max clock in accordance with the second resolution.

16. The method of claim 15, wherein the resolution change condition includes detecting at least one of:
a battery level of the electronic device being less than a specified value,
an area in a memory to which data is assigned being less than a first specified size, and
a size of a resource corresponding to an application in the memory being greater than a second specified size.

17. The method of claim 15, further comprising:
changing a size of the second screen such that the second screen matches a display size of the first screen displayed at the first resolution,
wherein the second screen is output to the display utilizing the changed size.

18. The method of claim 15, further comprising:
when the process is at least one of a foreground process and a process registered in a preconfigured list, transmitting by the processor an instruction to the process of an application causing a user interface is output according to the second resolution.

19. The method of claim 15, further comprising:
resetting the process when the process of an application is a background process; and
resetting the process when the process is the background process and remains in an inactive state for at least a predetermined time period.

20. The method of claim 15, further comprising:
displaying on the display a remaining usable time of the electronic device that is updated to reflect an extended remaining usable time when the first resolution is changed to the second resolution.

* * * * *